Dec. 18, 1934.   L. G. EBERT ET AL   1,984,524
SINK STRAINER
Filed April 9, 1934
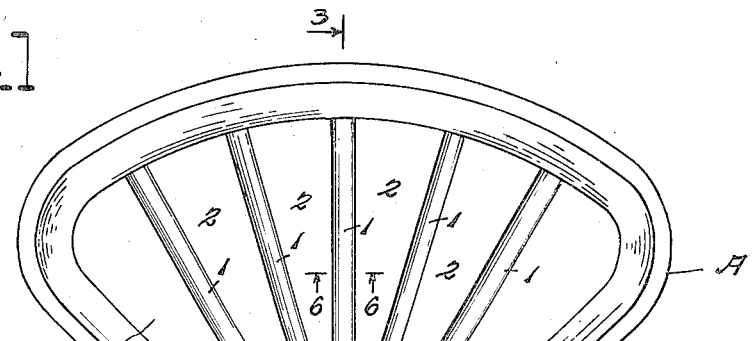
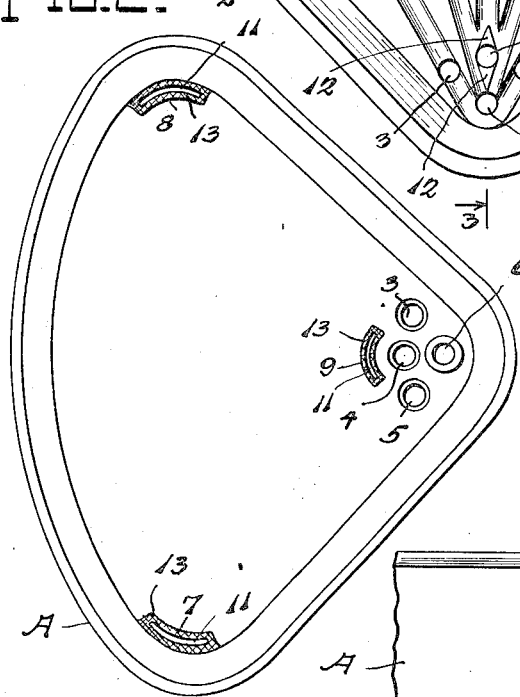
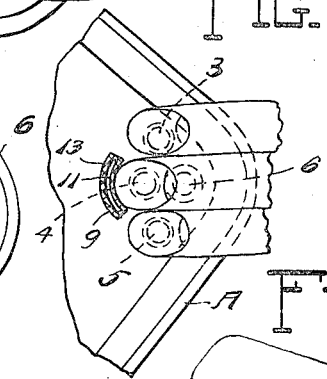
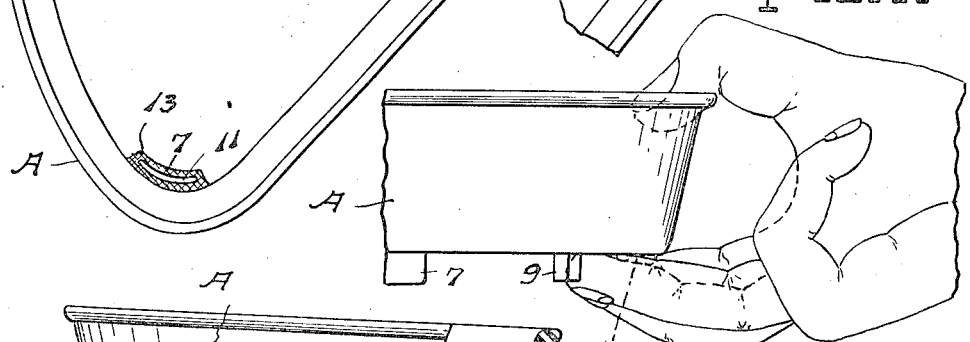
Inventor
LYDA G. EBERT.
MINNIE K. GRABLE.
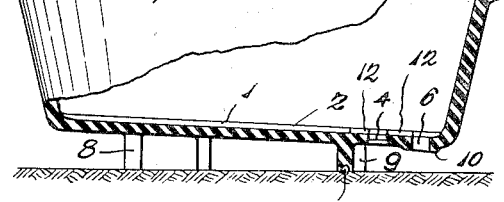
By Robert Cobb
Attorneys Patented Dec. 18, 1934

1,984,524

UNITED STATES PATENT OFFICE 1,984,524

SINK STRAINER

Lyda G. Ebert, Lakewood, Ohio, and Minnie K. Grable, Pittsburgh, Pa.

Application April 9, 1934, Serial No. 719,772

5 Claims. (Cl. 4—290)

This invention appertains to kitchen appliances and involves primarily a novel type of sink strainer for garbage, or similar waste, which is commonly thrown into such strainers when in use.

In the carrying out of the invention, it is contemplated to employ a strainer of the customary three cornered type preferably affording a somewhat triangular shape for positioning same in the corner portion of a sink readily. The intent is that the drain openings of the strainer of the invention shall be located in one corner only in order that when the strainer is lifted out of the sink to carry the garbage to a garbage receptacle usually outdoors, it may be possible to readily hold the openings at one corner of the receptacle closed to prevent water or other liquid in the strainer from leaking to the floor as the device is being carried from one place to another.

The objects of the present invention are twofold. In the first place, it is contemplated to employ a specific disposition or arrangement of the drain openings at the corner of the strainer such that when the article is grasped to carry garbage, or the like, contained therein, from one place to another, the arrangement of the fingers of the hand in grasping the strainer will be such that said fingers will close the drain openings effectively to obviate the possibility of leakage above referred to. A second object of the invention has been to devise a bottom structure for the strainer involving protuberant parts, or ribs, having peculiar dispositions in relation to the strainer openings such as to prevent clogging of these openings in the ordinary use of the article, which clogging would tend to cause the strainer to hold an undue quantity of water or liquid, which might be spilled in transporting the strainer from one place to another, while grasped in the hand.

With the foregoing objects primarily in view, a strainer embodying our invention will be more fully understood upon reference to the following detailed description and drawing, in which:—

Figure 1 is a top plan view of my strainer, showing primarily its interior ribbed construction.

Figure 2 is a bottom plan view bringing out more clearly the disposition of the strainer openings for outlet of liquid from the receptacle.

Figure 3 is a side view partially broken away and shown in cross section to more clearly illustrate the finger engaging portion of the bottom at the outlet openings, the line of section being on the line 3—3 of Figure 1.

Figure 4 is a fragmentary side view, illustrating how the strainer is grasped in the hand when being carried from one place to another for discharging the contents of the receptacle after removal from the ordinary kitchen sink for instance.

Figure 5 is a bottom plan view, fragmentary in nature, illustrating how the three first fingers of the hand will readily close the bottom openings of the strainer at the corner portion, when the receptacle is being carried from one place to another to discharge its contents, leakage of water through the said opening being absolutely guarded against in a very easy manner, as shown.

Figure 6 is a cross sectional view taken on the line 6—6 of Figure 1.

The type of sink strainer illustrated in the drawing has been indicated as one which is preferably triangular in general shape or contour so that it will readily fit into one portion of an ordinary kitchen or other sink. This shape is not necessarily material to the invention, since the device could be made of other shapes than that stated. The strainer will preferably be made of rubber, rubber compound, fibre, or the like, but it may be made of metal, if desired, as the principles of the invention may be adapted to a metal construction.

In so far as the interior construction of the receptacle of the invention is concerned, it is notable that the bottom of the strainer A is formed with grooves 1, and the portions of the bottom between the grooves 1 may be characterized as ribs or rib-like structures 2, including the portions at the outer sides of the more remotely spaced grooves 1. The rib-like portions 2 extend proximate to or between the drain openings 3, 4, 5 and 6 located at one of the corners of the strainer or receptacle.

Under these conditions, it will be seen that because the portions 2 are somewhat elevated above the openings 3, 4, 5 and 6, there is little tendency for larger particles of garbage or waste to become lodged in positions such as would close the openings aforesaid, and cause the liquid or water received by the receptacle to collect therein.

When disposed in the sink or other place equivalent to a sink, the receptacle A will rest upon suitable foot members 7, 8, and 9, the members 7 and 8 being at the rear of the receptacle, and the member 9 near the front, and since the foot 9 is somewhat shorter than the feet 7 and 8, the strainer receptacle normally inclines at its bottom toward the corner equipped with the drain openings, and under these conditions, the liquid or water will normally drain out of the receptacle.

The disposition of the openings 3, 4, 5 and 6 is peculiar and important to the invention. The openings 3, 4 and 5 are disposed on an arc so to speak, and are spaced fairly widely apart. The opening 6 is located in front or in line with the opening 4 and a medial line through the structure of the receptacle. The purpose of this arrangement of the openings will become apparent upon reference to Figures 4 and 5 of the drawing. Thus in the handling of the strainer receptacle, having in mind that the openings 3, 4, 5, and 6 are located adjacent to one corner portion of the device, it is possible to grasp the strainer in the manner shown in Figure 4 with the thumb engaging the upper corner portion adjacent to the openings, and the three fingers as seen in Figure 5 disposed beneath the bottom of the strainer so as to be positioned to readily close the several openings as the receptacle is carried, we will say, from the sink to the place of dumping same into an outer or other garbage container.

The positioning of the fingers in the manner shown in Figures 4 and 5 is facilitated by reason of the fact that the foot member 9 is curved and forms a stop or sort of gauge that limits the movement of the middle finger as it is applied to the strainer and causes said finger, along with the adjacent fingers, to be positioned properly so that the middle finger closes the openings 4 and 6, and the other two fingers close the openings 3 and 5.

The bottom of the strainer at the point adjacent to the opening 6 is slightly thickened, as is shown at 10 so that, upon closing the holes 3, 4, 5, the middle finger will also perfectly seal the opening 6. The several feet 7, 8, 9 are preferably provided with little suction grooves 11, the function of which is self evident, or the lower surface of the feet may be roughened as shown at 13. If desired, the opening 4 may have in front and rear thereof projections 12 of the same elevation as the portions 2 of the bottom of the receptacle, which are located between the grooves 1.

From the foregoing, it will be apparent that the strainer of this invention is very simple in its construction, may be molded practically in one unit or piece of material and offers especial advantages having in mind the convenience with which the strainer openings are closed as the receptacle is carried from one place to another and also having in view the fact that the bottom of the strainer at its upper side is equipped with the parts 2 and 12 formed adjacent to the strainer openings in such a way that clogging of the latter is not likely to take place in the ordinary handling and use of the device.

It is notable that at the lower ends the openings 3, 4, and 5 are countersunk by depressions or recesses in the under-side of the strainer. Such countersunk portions facilitate the reception of the fingers as shown in Figure 5 and the effective closing of the said openings as the strainer is supported when grasped in the hand as shown in Figure 4.

As seen in Figure 3 the thickened portion 10 of the bottom of the strainer at the opening 6 affords a protruding member readily received in the joint of the middle finger for effective closing of the opening 6 as the end of such finger is received in the depression or concavity formed by the countersinking of the opening 4. Thus the bottom portion of the strainer adjacent to the openings 3, 4, 5, and 6 is peculiarly formed so as to make sure that the fingers when grasping the strainer to carry it from one place to another will properly close the drain openings because the fingers of the hand assume proper inclinations and contacts effectively closing said openings as illustrated in the view of Figure 4.

Having thus described our invention, what we claim as new and desire to secure by Letters Patent of the United States, is:—

1. A strainer receptacle for sinks, or the like, the same comprising a body formed with a plurality of strainer openings adjacent to a side portion thereof, the upper surface of the bottom of the receptacle being formed with grooves merging toward the said strainer openings with the portions of the bottom between the grooves disposed at an elevation higher than the upper ends of the strainer openings so as to prevent clogging of the strainer openings in the manner set forth.

2. A strainer receptacle for sinks, comprising a body of angular construction providing corner portions, a series of openings located at one of the corner portions and substantially spaced apart, the upper surface of the bottom of the receptacle comprising elevated portions projecting between the said openings at an elevation higher than the upper ends of the openings, for the purpose set forth, the said bottom being formed with grooves between the said elevated portions which grooves are adapted to convey water or other liquid to the strainer openings.

3. As a new article of manufacture, a strainer of the class described, comprising an angular shaped body provided at a corner portion thereof with a series of openings formed in the bottom of the receptacle, certain of said openings being disposed in an arc, a foot member for supporting the receptacle projecting from the bottom thereof adjacent to said openings and disposed in spaced relation thereto as well as set back some distance from the corner of the receptacle so that the openings are disposed between the foot member and said corner of the receptacle, the foot member providing a stop or contact element to engage the middle finger of the hand so as to properly position said finger with the adjacent fingers beneath the receptacle in such a manner that they will close the strainer openings at the bottom when the receptacle at the corner having the openings is grasped between the thumb and fingers of the hand to carry it from one place to another.

4. A strainer receptacle for sinks, or the like, comprising a body portion provided with a bottom having a plurality of juxtaposed strainer openings disposed upon an arc so that the ends of the fingers of the hand may close said openings when grasping the strainer to carry it from one place to another, the said bottom also having an opening in line with one of the said juxtaposed openings and located between said opening and the edge portion of the strainer, the bottom of the strainer surrounding the last mentioned opening being thickened so as to protrude downwardly so as to enable the middle finger of the hand near the end joint to receive the protruding portion whereby to close the said last mentioned opening whilst the ends of the fingers are disposed in a position to close the first mentioned openings.

5. A strainer receptacle for sinks, or the like, comprising a body portion provided with a bottom having a plurality of juxtaposed strainer openings disposed upon an arc so that the ends of the fingers of the hand may close said openings when grasping the strainer to carry it from one place to another, the said bottom also having an opening in line with one of the said juxtaposed openings and located between said opening and the edge portion of the strainer, the bottom of the strainer surrounding the last mentioned opening being thickened so as to protrude downwardly so as to enable the middle finger of the hand near the end joint to receive the protruding portion whereby to close the said last mentioned opening whilst the ends of the fingers are disposed in a position to close the first mentioned openings, and the said juxtaposed openings receiving the ends of the fingers when the strainer is grasped, being countersunk from the undersurface of the strainer to form concave portions ensuring effective closing of the openings in the grasping of the strainer in handling the same to carry it from one place to another.

LYDA G. EBERT.
MINNIE K. GRABLE.